(12) United States Patent
Nübling et al.

(10) Patent No.: US 7,970,269 B2
(45) Date of Patent: Jun. 28, 2011

(54) IMAGE ACQUISITION APPARATUS

(75) Inventors: Ralf Ulrich Nübling, Denzlingen (DE); Helmut Weber, Emmendingen (DE)

(73) Assignee: SICK AG, Waldkirch/Breisgau (DE)

( * ) Notice: Subject to any disclaimer, the term of this patent is extended or adjusted under 35 U.S.C. 154(b) by 6 days.

(21) Appl. No.: 12/457,768

(22) Filed: Jun. 19, 2009

(65) Prior Publication Data

US 2010/0021151 A1    Jan. 28, 2010

(30) Foreign Application Priority Data

Jun. 20, 2008 (EP) ..................................... 08011246

(51) Int. Cl.
*G03B 15/02* (2006.01)

(52) U.S. Cl. .......................................... 396/61; 396/62

(58) Field of Classification Search .................... 396/61, 396/62

See application file for complete search history.

(56) References Cited

U.S. PATENT DOCUMENTS

| | | | |
|---|---|---|---|
| 4,874,933 A | | 10/1989 | Sanner |
| 5,280,161 A | * | 1/1994 | Niwa ........................ 235/462.42 |
| 5,378,883 A | * | 1/1995 | Batterman et al. ........ 235/462.21 |
| 5,727,235 A | * | 3/1998 | Ishikawa et al. ................ 396/62 |
| 6,039,255 A | * | 3/2000 | Seo ........................... 235/462.35 |
| 6,105,869 A | * | 8/2000 | Scharf et al. .................... 235/454 |
| 6,889,903 B1 | | 5/2005 | Koenck |
| 2001/0028792 A1 | * | 10/2001 | Shimizu .......................... 396/62 |
| 2006/0045501 A1 | * | 3/2006 | Liang et al. ..................... 396/62 |
| 2007/0131770 A1 | | 6/2007 | Nunnink |
| 2008/0239509 A1 | * | 10/2008 | Vinogradov .................. 359/709 |
| 2009/0159685 A1 | * | 6/2009 | Shi et al. .................. 235/462.42 |
| 2010/0155487 A1 | * | 6/2010 | Liu et al. .................. 235/462.42 |

FOREIGN PATENT DOCUMENTS

| | | |
|---|---|---|
| EP | 1112522 | 7/2001 |
| JP | 2005 234367 A | 9/2005 |
| WO | 99/64980 A1 | 12/1999 |

\* cited by examiner

*Primary Examiner* — Rodney E Fuller

(74) *Attorney, Agent, or Firm* — The Nath Law Group; Jerald L. Meyer; Jonathan A. Kidney

(57) ABSTRACT

The invention relates to an image acquisition apparatus, in particular a camera, for the identification of objects, comprising a focusable optical receiving system and an illumination unit including an object illumination and/or positioning illumination, wherein the object illumination and/or positioning illumination is adjustable and can hereby be matched to the focus of the optical receiving system, and wherein the object illumination and/or positioning illumination is coupled to the optical receiving system such that an adjustment of the focus of the optical receiving system automatically effects a matching of the object illumination and/or positioning illumination to the adjusted focus.

16 Claims, 6 Drawing Sheets

Figure 1:
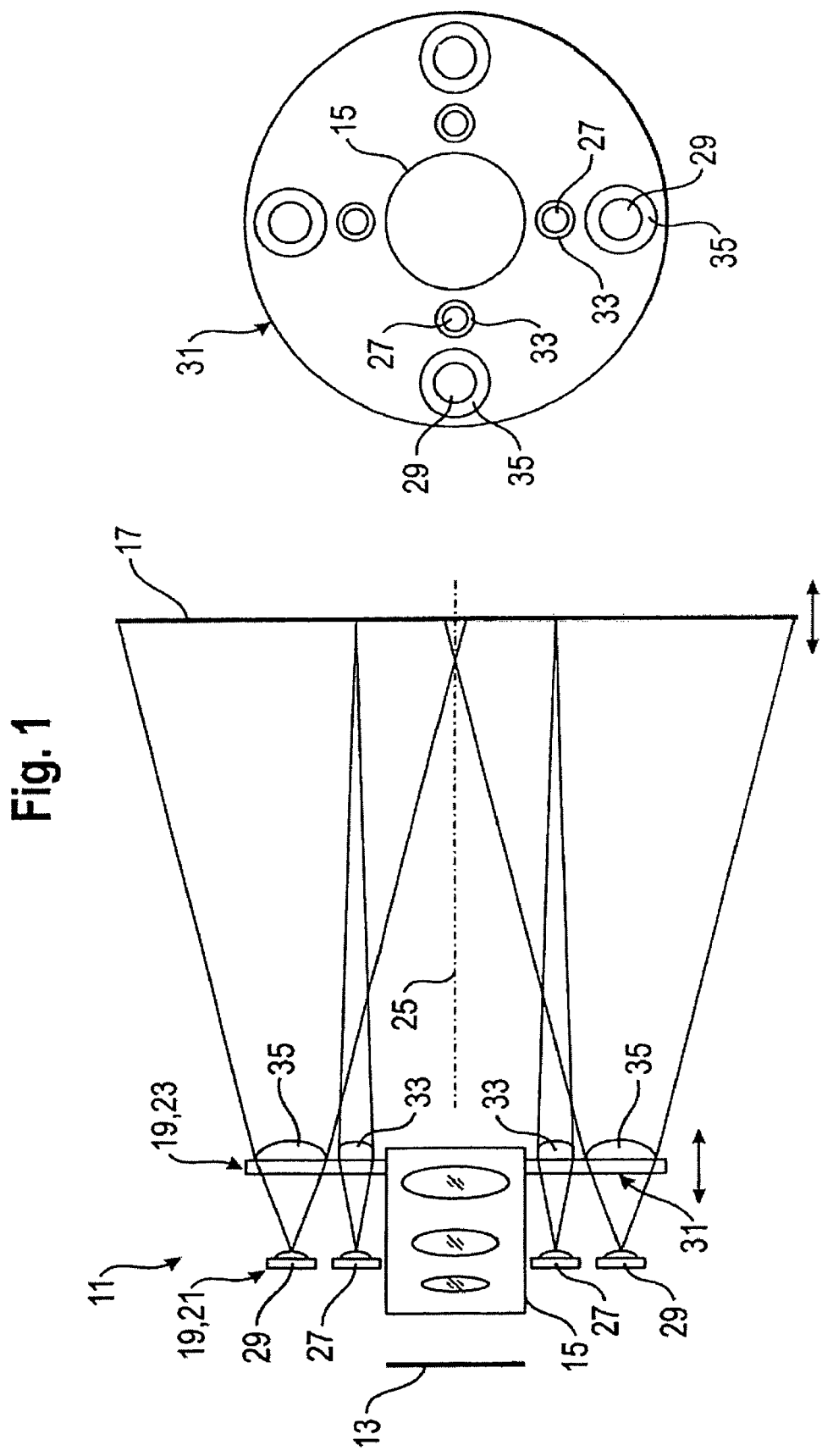

Fig. 3
a) In focus
b) Out of focus
Fig. 4
a) In focus
 
 
b) Out of focus
 
 
 
 

IMAGE ACQUISITION APPARATUS

The present invention relates to an image acquisition apparatus, in particular to a camera, for the identification of objects, comprising a focusable optical receiving system and an illumination unit including an object illumination and/or a positioning illumination.

An image acquisition apparatus can be equipped with an object illumination by which a respective object is illuminated for the identification of objects, for example for the reading of barcodes on parcels or for the recognition, evaluation and/or analysis of patterns on objects. It is often attempted in this respect to generate an image of the object which is as homogeneous as possible. Provision can, for example, be made for this purpose that the object is illuminated more strongly at the marginal regions than in the center (edge increase) to compensate vignetting of the optical receiving system. This can e.g. be achieved by skillful superimposition of a plurality of light sources and/or by the use of corresponding diffractive optical elements and/or free-form surfaces, with the object illumination in each case being optimized to a specific spacing of the object from the image acquisition apparatus.

Objects which have a spacing from the image acquisition apparatus differing from the specific spacing can then admittedly be focused by means of the focusable optical receiving system, but can as a rule no longer be ideally illuminated so that inhomogeneous images may arise.

The same applies accordingly to an optical positioning aid which can, for example, be provided to deliver information on the position, alignment and/or spacing of the respective object from the image acquisition apparatus or to set the desired spacing and/or the desired orientation of the image acquisition apparatus with respect to the object on the setting up of the image acquisition apparatus. Such an optical positioning aid can, for example, be represented by laser beams which extend obliquely to one another and which intersect at a preset spacing from the image acquisition device or by an image of an object, e.g. of a diaphragm contour or of an LED, focused to a preset spacing.

Such an optical positioning aid, which is usually also called positioning illumination, is therefore likewise optimized to a specific spacing.

It is the object of the present invention to provide an image acquisition apparatus of the initially named kind which avoids the aforesaid disadvantages.

This object is satisfied by an image acquisition apparatus in which the object illumination and/or positioning illumination is adjustable and can be matched to the focus of the optical receiving system, with the object illumination and/or the positioning illumination being coupled to the optical receiving system such that an adjustment of the focus of the optical receiving system automatically effects a matching of the object illumination and/or positioning illumination to the adjusted focus.

The object illumination and/or positioning illumination is therefore adjustable and can be matched to the focus of the optical receiving system. An adjustment of the focus of the optical receiving system in this respect necessarily and/or automatically effects an adjustment of the object illumination and/or positioning illumination matched to the adjusted focus. A manual carrying out of the matching is in particular not necessary since the object illumination and/or positioning illumination is fixedly coupled to the optical receiving system.

It can be achieved by the image acquisition apparatus in accordance with the invention that a respective at least largely ideal object illumination and/or positioning illumination can also be ensured for different focus settings or distance settings of the optical receiving system. It is consequently not necessary to provide a plurality of image acquisition apparatus for different spacings at which the objects may be located, with the object illumination and/or positioning illumination of said image acquisition apparatus each only being optimized to one single spacing and being different from one another.

Provision is in particular made that the illumination unit, in particular optical beam shaping systems of the illumination unit such as optical diversion systems or optical deflection systems, is matched to the optical receiving system, in particular to its characteristics, and/or ensures that the object illumination and/or the positioning illumination coincides with the actual object region of the optical receiving system, i.e. with the set distance. The designs of the optical systems of the illumination unit and of the optical receiving system are in particular matched to one another such that a matched and/or ideal object illumination and/or positioning illumination is ensured for all required working distances.

With the image acquisition apparatus in accordance with the invention, only the object illumination, only the positioning illumination or both illuminations can be provided. If both illuminations are present, provision can also be made that only one of the two illuminations is adjustable and can be matched to the focus of the optical receiving system. The wavelengths of the light of the light sources for the object illumination and the positioning illumination can be the same or different.

The distance setting of the optical receiving system can, for example, take place manually, by a motor or also by means of other actuators such as piezoactuators or moving coils, with or without autofocus. The optical receiving system can be adjustable continuously or in discrete steps. The optical receiving system can furthermore be made in one part or in multiple parts, in particular with one or more lenses, and can optionally include further components such as extraneous light filters or disks. The optical receiving system can furthermore be of transmissive design when e.g. lenses are used and/or reflective when e.g. mirrors are used.

In accordance with an embodiment of the invention, the illumination unit includes a light source unit with at least one light source and an optical beam shaping unit associated with the light source unit and having at least one optical beam shaping system. A plurality of light sources and a plurality of optical beam shaping systems can also be provided, with then a separate optical beam shaping system being able to be associated with each light source. It is furthermore also possible that an optical beam shaping system is associated with a plurality of light sources, i.e. a plurality of light sources can be provided with a common optical beam shaping system. A respective light source or a respective optical beam shaping system can belong to the object illumination or to the positioning illumination.

The term "light" should also be understood as electromagnetic radiation in general, i.e. in particular ultraviolet light (UV), visible light (VIS) and infrared light (IR).

A respective optical beam shaping system can be made in one or more parts, in particular with one or more lenses, and optionally include further components such as diaphragms or contours. Furthermore, a respective optical beam shaping system can include lenses, free-form surfaces, diffractive optical elements (DOE), holographic optical elements (HOE) and/or wedges for beam direction change. Furthermore, a respective optical beam shaping system can be transmissive when e.g. lenses are used and/or reflective when e.g. mirrors are used. In addition, a respective optical beam shaping system or one or more parts thereof can have one or more planar and/or curved surfaces at which the light beams transmitted from the respectively associated light source are refracted and/or reflected.

The matching of the object illumination and/or positioning illumination can take place, for example, by adjustment of the relative position of the optical beam shaping system unit with respect to the light source unit, in particular of the spacing between the optical beam shaping unit and the light source unit.

The adjustment of the focus of the optical receiving system can in particular take place by axial displacement of the optical receiving system or of the part thereof decisive for the adjustment of the focus such as with a rear focus in which the distance setting does not take place by displacement of the total optical receiving system, but rather by displacement of one or more individual lenses, whereby the focal length of the optical receiving system is changed. The adjustment of the object illumination and/or positioning illumination can take place by an axial displacement of the light source unit and/or of the optical beam shaping unit.

The illumination unit and the optical receiving system can be coupled to one another such that an axial displacement of the optical receiving system or of the part thereof decisive for the adjustment of the focus effects a corresponding axial displacement of the light source unit or optical beam shaping unit, i.e. the axial displacements can have the same stroke. It is, however, generally also possible that the light source unit or the optical beam shaping unit is coupled to the optical receiving system via a conversion ratio, in particular different from 1, i.e. the light source unit or the optical beam shaping unit is not displaced by the same path as the optical receiving system or its decisive part.

The light source unit or the optical beam shaping unit or a part thereof can be fixedly connected to the optical receiving system or to the part decisive for the adjustment of the focus. Complex and/or expensive mechanical and/or electrical designs for the coupling of the illumination unit to the optical receiving system can then be omitted.

In accordance with another embodiment of the invention, the matching of the object illumination and/or positioning illumination takes place by a change of the focal length of the object illumination and/or positioning illumination and/or by a change of the inclination of the radiation directions of bundles of rays transmitted by the image acquisition apparatus with respect to the optical axis of the optical receiving system.

In order to achieve a better object illumination and/or larger-area positioning illumination, above all with larger objects, a plurality of light sources and a plurality of associated optical beam shaping systems can be provided.

The positioning illumination can in particular include at least one pair of light sources, in particular laser transmitters or light emitting diodes, and one or more optical beam shaping systems associated with the at least one pair of light sources to generate bundled light beams which intersect at the distance focused by the optical receiving system. The light beams are preferably in each case a parallel bundle of rays which has a limited cross-section so that light spots, i.e. e.g. approximately point-like light spots, are generated on incidence on the objects. However, all other geometries can also advantageously be used, e.g. also two lines which are superimposed on one another to form a cross. Other examples include two rings which are concentric at the focused position, or two dots which have a minimal spacing from one another at the focused position.

Generally, more than only two light beams can also be used which form one or more points of intersection or patterns.

The arrangement and/or design of the illumination unit, for example the structure, the shape and/or the one or more diversion and/or deflection surfaces of the illumination unit, is in particular matched to the different focuses of the optical receiving system, i.e. the optical design of the optical receiving system and of the illumination unit are matched to one another such that an least largely ideal object illumination and/or positioning illumination is given for all possible focuses, in particular for different positions of the optical receiving system. The illumination unit can, for example, include an optical beam shaping system which has a curved surface at which light beams transmitted from an associated light source are refracted and/or reflected, with the light beams being refracted and/or reflected at different positions of the optical receiving system and/or at least one optical beam shaping system at different points or regions of the curved surface.

One possibility of object illumination and/or positioning illumination is to arrange a plurality of light sources and/or a plurality of associated optical beam shaping systems along a circular path around the optical receiving system.

A plurality of mutually replaceable focusable optical receiving systems whose focal lengths or focal length ranges are different from one another can be provided for the matching of the image section taken by the image acquisition apparatus. A focal length range associated with an optical receiving system is in particular present when the distance setting takes place by rear focusing.

It is then preferred if a plurality of mutually replaceable optical beam shaping systems or optical beam shaping units are provided which are matched to the different focal lengths or focal length ranges of the plurality of optical receiving systems.

Alternatively or additionally to this, the optical beam shaping unit can include a plurality of optical beam shaping systems or a plurality of groups of optical beam shaping systems which are matched to the different focal lengths or focal length regions of the plurality of optical receiving systems, with the optical beam shaping systems of a group of optical beam shaping systems being matched to the same focal length or to the same focal length range.

It is in particular preferred in this case if the optical beam shaping unit is rotatable about its axis since then the optical beam shaping system suitable for the respective optical receiving system can be associated with the respective light source by a simple turning of the optical beam shaping unit.

Provided that a plurality of groups of optical beam shaping systems are provided, it is preferred if the optical beam shaping systems are arranged along a circular path about the optical receiving system, with the optical beam shaping systems of different groups being arranged alternately.

Provision can alternatively be made that the optical beam shaping unit is laterally displaceable.

The optical beam shaping systems can also be arranged along a line, with the optical beam shaping systems of different groups being arranged alternately.

The image acquisition apparatus is preferably designed such that the object illumination and the positioning illumination are not simultaneously active. The positioning illumination can in particular be active when the object illumination is inactive, and vice versa. It is, however, also possible that the positioning illumination is only active in a set-up mode of the image acquisition apparatus. The object illumination and the positioning illumination can, however, also be active simultaneously and have different wavelengths, for example. In particular in this case, a blocking filter can e.g. be provided in front of the optical receiving system for the blocking of the positioning illumination.

The invention furthermore relates to a method for the identification of objects by means of an image acquisition apparatus such as has been described above, with the object illumination and/or the positioning illumination being adjusted automatically on an adjustment of the focus of the optical receiving system and being hereby matched to the focus of the optical receiving system.

Special embodiments and advantages of the method in accordance with the invention result in an analog manner from the embodiments and advantages of the image acquisition unit in accordance with the invention explained above.

Figure 2:
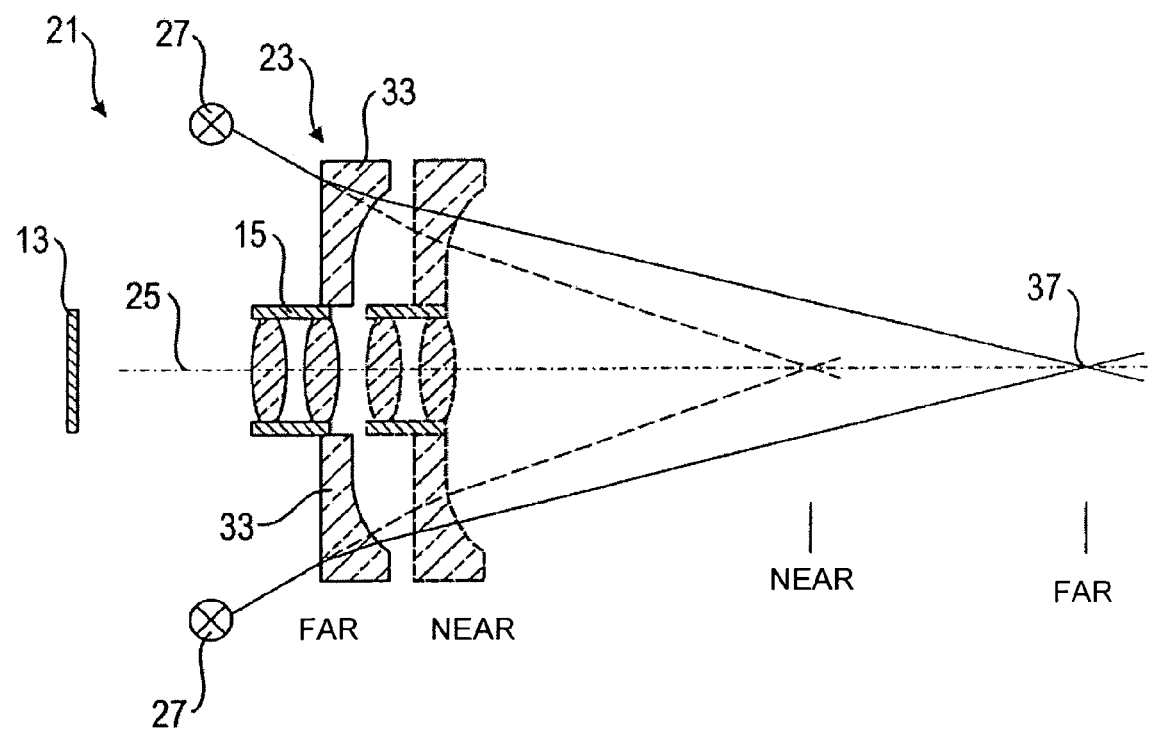
Figure 5:
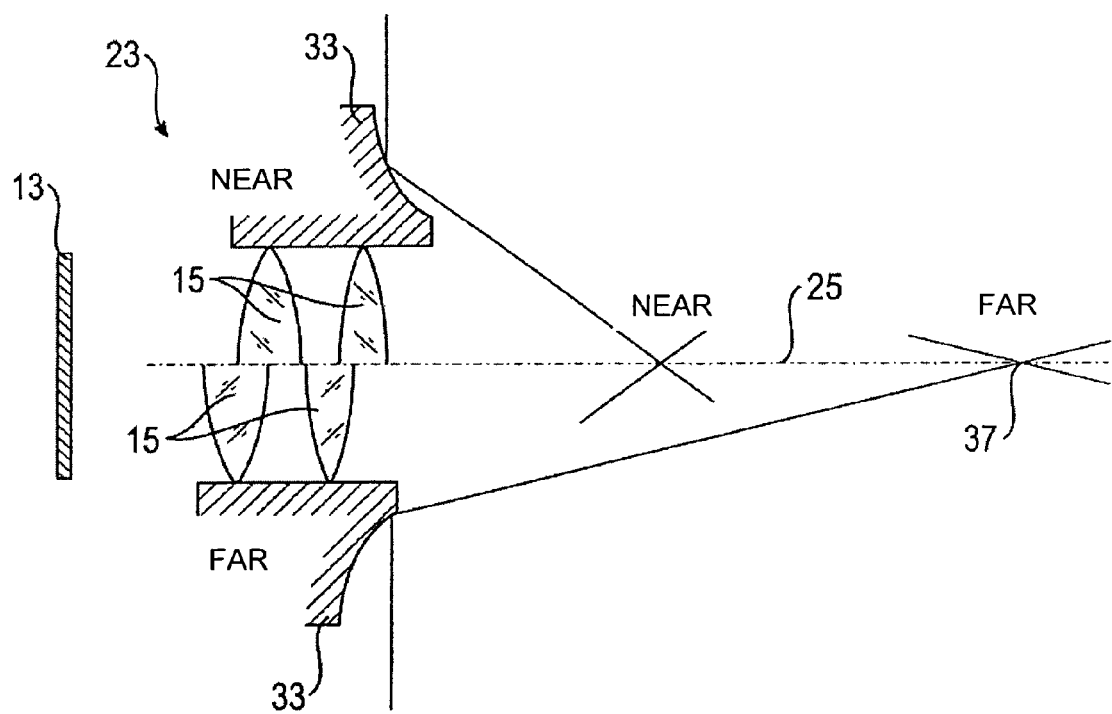
Figure 6:
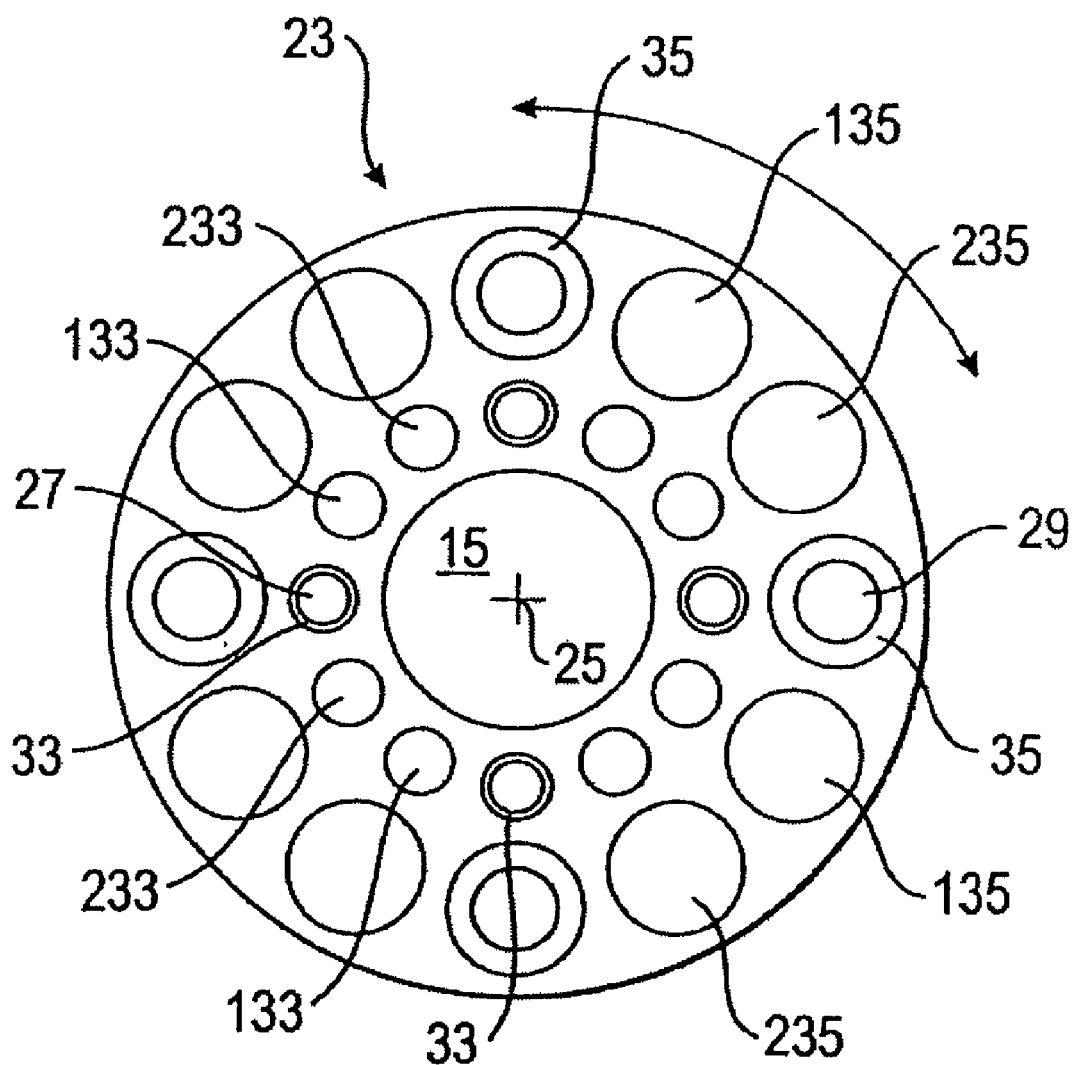
Figure 7:
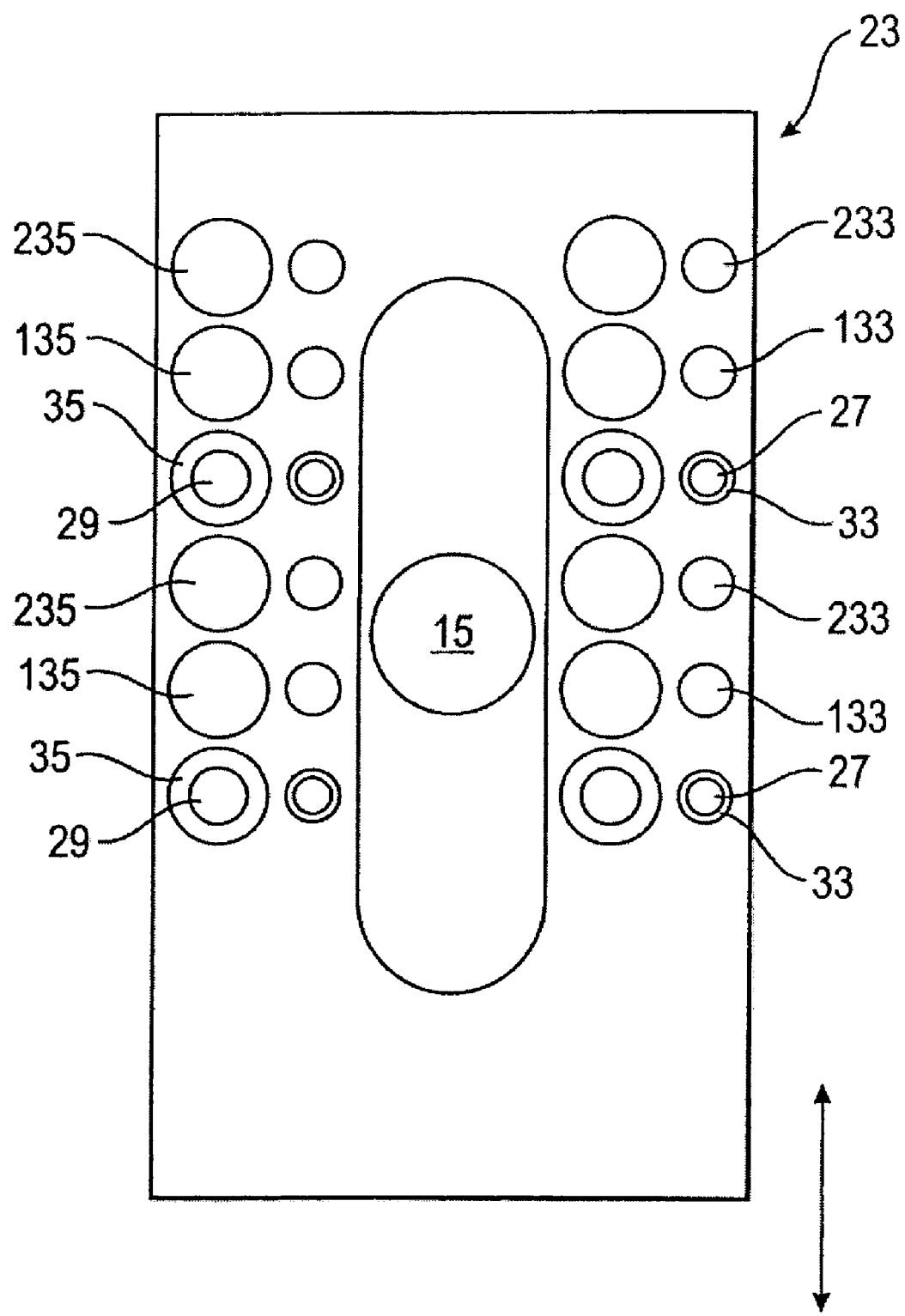

The invention will be described in the following by way of example with reference to the drawing. There are shown, schematically in each case:

FIG. 1 different views of a camera in accordance with the invention in accordance with a first embodiment with object illumination and positioning illumination;

FIG. 2 an axial section through a camera in accordance with the invention in accordance with a second embodiment with positioning illumination;

FIG. 3 positioning images generated on an object by the positioning illumination in accordance with FIG. 2;

FIG. 4 positioning images generated on an object by positioning illumination of a camera in accordance with the invention in accordance with a third embodiment;

FIG. 5 an axial section through a camera in accordance with the invention in accordance with a fourth embodiment with a positioning illumination, FIG. 6 a frontal view of a camera in accordance with the invention in accordance with a fifth embodiment with object illumination and positioning illumination; and FIG. 7 a frontal view of a camera in accordance with the invention in accordance with a sixth embodiment with object illumination and positioning illumination.

The camera 11 for the identification of objects in accordance with the first embodiment shown in FIG. 1 in a side view (left) and in a frontal view (right) includes an image sensor 13 and an optical receiving system in the form of an objective 15 to take two-dimensional images of objects 17 located in front of the camera 11. To be able to ensure that a respective object 17 is imaged sharply independently of its spacing from the camera 11, the objective 15 is made focusable. An autofocus can be provided for this purpose.

In addition, the camera 11 includes a ring-shaped illumination unit 19 at whose center the objective 15 is received. The illumination unit 19 includes a light source unit 21 and an optical beam shaping unit 23 associated with the light source unit 21.

The light source unit 21 has a mount plate, not shown, on which four light sources 27 of a first type and four light sources 29 of a second type are arranged. The light sources 27 and the light sources 29 are in this respect each arranged along a circular path about the objective 15 and equidistant with respect to one another, with the light sources 27 of the first type being disposed further inwardly than the light sources 29 of the second type.

The optical beam shaping unit 23 has a mount plate 31 on which four optical beam shaping systems 33 of a first type and four optical beam shaping systems 35 of a second type are arranged. The optical beam shaping systems 33 and the optical beam shaping systems 35 are in this respect each arranged along a circular path about the objective 15 and equidistant with respect to one another, with the optical beam shaping systems 33 of the first type being disposed further inwardly than the optical beam shaping systems 35 of the second type.

A separate optical beam shaping system 33 of the first type is associated with each light source 27 of the first type. A separate optical beam shaping system 35 of the second type is associated with each light source 29 of the first type.

The light sources 27 of the first type, together with the optical beam shaping systems 33 of the first type, form a positioning illumination to generate sharp light spots on the respective object 17 from light which was transmitted from the light sources 27 of the first type and was deflected or diverted by the optical beam shaping systems 33.

The light sources 29 of the second type, together with the optical beam shaping systems 35 of the second type, form an object illumination to illuminate the respective object 17 with light which was transmitted from the light sources 29 of the second type and was deflected or diverted by the optical beam shaping systems 35 of the second type and to generate an image of the respective object 17 which is as homogenous as possible.

The positioning illumination 27, 33 and the object illumination 29, 35 are usually each optimized to a very specific spacing of the objects 17 from the camera 11 so that the respective ideal illumination is provided on an adjustment of the focus of the objective 15.

In accordance with the invention, the positioning illumination 27, 33 and the object illumination 29, 35 are, however, automatically adjustable and can be matched to the focus of the objective 15 so that a respective at least largely ideal positioning illumination and object illumination can also be ensured for different focuses or distance settings of the objective 15, as will be explained in more detail in the following with reference to the further embodiments in accordance with FIGS. 2 to 6.

The camera 11 in accordance with the second embodiment in accordance with FIG. 2, unlike the camera 11 in accordance with the first embodiment in accordance with FIG. 1, does not have any object illumination, but only a positioning illumination 27, 33. An embodiment with object illumination is naturally also possible. The light source unit 21 of the positioning illumination 27, 33 includes two laser transmitter 27 disposed diametrically opposite with respect to the optical axis 25 of the objective 15. The laser transmitters 27 are in this respect arranged behind a transmissive optical beam shaping unit 23 which has two optical beam shaping systems 33. The optical beam shaping systems 33 are each made planar at their rear sides and each have a curved surface at their front sides at which the laser beams of the laser transmitters 27 are each refracted before they intersect at a point of intersection 37 at the object side. Other radiation sources such as light emitting diodes can also be used instead of the laser transmitters 27.

The optical beam shaping system 23 is fixedly connected to the objective 15 so that an axial displacement of the objective 15 to adjust the focus of the objective 15 necessarily effects an axial displacement of the optical beam shaping unit 23. The light source unit 21 with the two laser transmitters 27 is not displaced on an adjustment of the focus of the objective 15 so that a change in the spacing between the optical beam shaping unit 23 and the light source 21 occurs. In this way, an automatic matching of the positioning illumination 27, 33 to the adjustment focus can be achieved, as will be explained in more detail in the following.

The objective 15 and the optical beam shaping unit 23 fixedly connected thereto are shown in two different adjustment positions in FIG. 2.

In the first adjustment position (shown in the form of dashed lines in FIG. 2), in which the objective 15 is disposed further away from the image sensor 13, focusing is on a smaller spacing NEAR. In the first adjustment position, the laser beams are refracted at the front and rear sides of the optical beam shaping system 23 such that they intersect at the spacing NEAR in front of the camera 11.

In the second adjustment position (shown in the form of solid lines in FIG. 2), in which the objective 15 is disposed more closely to the image sensor 13, focusing is on a larger distance FAR. In the second adjustment position, the laser beams are refracted at the front and rear sides of the optical beam shaping system 33 such that they intersect at the spacing FAR in front of the camera 11.

The matching of the positioning illumination 27, 33 therefore takes place by adjusting the spacing at which the two laser beams meet or by changing the inclination of the radiation directions of the laser beams transmitted by the camera 11 with respect to the optical axis 25 of the optical receiving system 15.

If an object 17 is in the focus of the positioning illumination 27, 33 the point of intersection of the two laser beams is also on the object 17 on which a common light spot is then visible (FIG. 3a). The common light spot can also be used, for example, for the visualization of an object field center. If an object 17 were out of focus, two separate light spots would occur (FIG. 3b).

It is, however, generally also possible that more than two laser transmitters 27 are used. For example, when a total of eight laser transmitters 27 are used, in accordance with a third embodiment, four common light spots are generated which form a rectangle for the visualization of a reading field (FIG. 4a). With an object 17 out of focus, eight separate light spots would then occur (FIG. 4b).

FIG. 5 shows the camera 11 in accordance with the fourth embodiment which substantially corresponds to the camera 11 in accordance with the second embodiment in accordance with FIG. 2 so that in the following only the differences between these two embodiments will be looked at. In comparison with the camera 11 from FIG. 2, with the camera 11 in accordance with FIG. 5, the optical beam shaping unit 23 is not made transmissive, but rather reflective. The optical beam shaping unit 23 in accordance with FIG. 5 for this purpose includes two optical beam shaping systems 33 which each have a curved surface at their front sides at which the laser beams of the laser transmitters 27, which are directed perpendicular to the optical axis 25 of the objective 15 in FIG. 4, are respectively refracted before they intersect at the point of intersection 37 at the object side. The distance setting NEAR is shown in the upper drawing half of FIG. 5; the distance setting FAR is shown in the lower drawing half of FIG. 5.

In the camera 11 in accordance with the fifth embodiment (FIG. 6), which is related to the camera 11 of FIG. 1, three mutually replaceable objectives 15 are provided (of which only one objective 15 is shown) which have mutually different focal lengths or focal length ranges. Accordingly, the optical beam shaping unit 23 includes three groups of optical beam shaping systems 33, 35; 133, 135; 233, 235 which are matched to the different focal lengths or focal length ranges of the three objectives 15, with a separate optical beam shaping system group 33, 35; 133, 135; 233, 235 being associated with each objective 15. The light source unit 21 of the camera 11 in accordance with FIG. 6, in contrast, corresponds to the light source unit 21 from FIG. 1.

Each optical beam shaping system group 33, 35; 133, 135; 233, 235 includes four optical beam shaping systems 33, 133, 233 of the first type (for the positioning illumination) and four optical beam shaping systems 35, 135, 235 of the second type (for the object illumination). The optical beam shaping systems 33, 133, 233 of the first type and the optical beam shaping systems 35, 135, 235 of the second type are each arranged along a circular path about the objective 15, with the optical beam shaping systems 33, 133, 233, 35, 135, 235 being arranged alternately for each type. Shown in an illustrative manner, the optical beam shaping unit 23 in accordance with FIG. 6 can be obtained in that the respective optical beam shaping systems 133, 135, 233, 235 of the second and third optical beam shaping groups 133, 135; 233, 235 are arranged between the optical beam shaping systems 33, 35 of FIG. 1 (which correspond to the first optical beam shaping group of FIG. 6).

Furthermore, the optical beam shaping unit 23 is rotatable about its axis, which corresponds to the optical axis 25 of the objective 15.

If the objective 15 of the camera 11 is now changed to obtain a different focal length or a different focal length range, the optical beam shaping group 33, 35; 133, 135; 233, 235 suitable for the respective objective 15 used can be selected by a simple turning of the optical beam shaping unit 23 and can be brought to coincide with the light sources 27, 29 of the camera 11.

FIG. 7 shows the camera 11 in accordance with the sixth embodiment which substantially corresponds to the camera 11 in accordance with the fifth embodiment in accordance with FIG. 6 so that in the following only the differences between these two embodiments will be looked at. In comparison with the camera 11 from FIG. 6, in the camera 11 in accordance with FIG. 7, the optical beam shaping unit 23 is not rotatable about the optical axis 25 of the objective 15, but is rather displaceable laterally to the optical axis 25 of the objective 15. Accordingly, the optical beam shaping systems 33, 133, 233 of the first type and the optical beam shaping systems 35, 135, 235 of the second type are each not arranged along a circular path about the objective 15, but rather each along a line. If in the camera 11 in accordance with FIG. 7, the objective 15 of the camera 11 is changed, the optical beam shaping group 33, 35; 133, 135; 233, 235 suitable for the respective objective 15 used can be selected by a simple displacement of the optical beam shaping unit 23.

The present invention makes it possible also always to ensure the ideal object illumination and/or positioning illumination for different distance settings of the objective 15.

| Reference numeral list | |
| --- | --- |
| 11 | camera |
| 13 | image sensor |
| 15 | objective |
| 17 | object |
| 19 | illumination unit |
| 21 | light source unit |
| 23 | optical beam shaping unit |
| 25 | optical axis |
| 27 | light source |
| 29 | light source |
| 31 | mount plate |
| 33 | optical beam shaping system |
| 35 | optical beam shaping system |
| 37 | point of intersection |
| 133 | optical beam shaping system |
| 135 | optical beam shaping system |
| 233 | optical beam shaping system |
| 235 | optical beam shaping system |

The invention claimed is:

1. An image acquisition apparatus, in particular a camera, for the identification of objects, comprising:

a focusable optical receiving system; and an illumination unit including an object illumination and/or positioning illumination, wherein the object illumination and/or positioning illumination is adjustable to permit matching the object illumination and/or positioning illumination to the focus of the optical receiving system, with the object illumination and/or positioning illumination being coupled to the optical receiving system such that an adjustment of the focus of the optical receiving system automatically effects a matching of the object illumination and/or positioning illumination to the adjusted focus, and with the positioning illumination including at least one pair of light sources and one or more optical beam shaping systems associated with the at least one pair of light sources to generate bundled light beams which visualize a distance focused by the optical receiving system.

2. An image acquisition apparatus in accordance with claim 1, wherein the illumination unit includes a light source unit having at least one light source and an optical beam shaping unit associated with the light source unit and having at least one optical beam shaping system.

3. An image acquisition apparatus in accordance with claim 2, wherein the adjustment of the focus of the optical receiving system takes place by axial displacement of the optical receiving system or of a part thereof decisive for the adjustment of the focus; and/or in that the adjustment of the object illumination and/or positioning illumination takes place by axial displacement of the light source unit and/or of the optical beam shaping unit.

4. An image acquisition apparatus in accordance with claim 2, wherein the light source unit or the optical beam shaping unit or a part thereof is fixedly connected to the optical receiving system or to a part thereof decisive for the adjustment of the focus.

5. An image acquisition apparatus in accordance with claim 1, wherein the matching of the object illumination and/or positioning illumination takes place by adjustment of a relative position of the optical beam shaping unit with respect to the light source unit, in particular of a spacing between the optical beam shaping unit and the light source unit.

6. An image acquisition apparatus in accordance with claim 1, wherein the matching of the object illumination and/or positioning illumination takes place by changing a focal length of the object illumination and/or positioning illumination and/or by changing an inclination of radiation directions of bundles of rays transmitted by the image acquisition apparatus with respect to the optical axis of the optical receiving system.

7. An image acquisition apparatus in accordance with claim 1, wherein the visualization comprises that the bundled light beams intersect at the distance focused by the optical receiving system.

8. An image acquisition apparatus in accordance with claim 1, wherein an arrangement and/or design of the illumination unit is matched to different focuses of the optical receiving system.

9. An image acquisition apparatus in accordance with claim 1, wherein a plurality of light sources and/or the plurality of associated optical beam shaping systems are arranged along a circular path about the optical receiving system.

10. An image acquisition apparatus in accordance with claim 1, wherein a plurality of mutually replaceable focusable optical receiving systems are provided whose focal lengths or focal length ranges are different from one another.

11. An image acquisition apparatus in accordance with claim 10, wherein a plurality of mutually replaceable optical beam shaping systems or optical beam shaping units are provided which are matched to the different focal lengths or focal length ranges of the plurality of optical receiving systems.

12. An image acquisition apparatus in accordance with claim 10, wherein the optical beam shaping unit includes a plurality of optical beam shaping systems or a plurality of groups of optical beam shaping systems which are matched to the different focal lengths or focal length ranges of the optical receiving system, with the optical beam shaping systems of a group of optical beam shaping systems being matched to the same focal length or to the same focal length range.

13. An image acquisition apparatus in accordance with claim 12, wherein the optical beam shaping unit is rotatable about its axis and/or the optical beam shaping systems are arranged along a circular path about the optical receiving system, with the optical beam shaping systems of different groups being arranged alternately.

14. An image acquisition apparatus in accordance with claim 12, wherein the optical beam shaping unit is laterally displaceable and/or the optical beam shaping systems are arranged along a line, with the optical beam shaping systems of different groups being arranged alternately.

15. A method for the identification of objects by means of an image acquisition apparatus, in particular a camera, for the identification of objects, comprising a focusable optical receiving system and an illumination unit including an object illumination and/or positioning illumination, wherein the object illumination and/or positioning illumination is adjustable to permit matching of the object illumination and/or positioning illumination to the focus of the optical receiving system, with the object illumination and/or positioning illumination being coupled to the optical receiving system, the method comprising:

on an adjustment of the focus of the optical receiving system, automatically adjusting the object illumination and/or positioning illumination to match the object illumination and/or positioning illumination to the focus of the optical receiving system, and generating bundled light beams which visualize a distance focused by the optical receiving system.

16. An image acquisition apparatus, in particular a camera, for the identification of objects, comprising:

a focusable optical receiving system; and an illumination unit including an object illumination and/or positioning illumination, wherein the object illumination and/or positioning illumination is adjustable to permit matching the object illumination and/or positioning illumination to the focus of the optical receiving system, with the object illumination and/or positioning illumination being coupled to the optical receiving system such that an adjustment of the focus of the optical receiving system automatically effects a matching of the object illumination and/or positioning illumination to the adjusted focus, and with the positioning illumination including at least one pair of light sources and one or more optical beam shaping systems associated with the at least one pair of light sources to generate bundled light beams which intersect at a distance focused by the optical receiving system.

* * * * *